(12) United States Patent
McDonnell et al.

(10) Patent No.: US 6,600,011 B2
(45) Date of Patent: Jul. 29, 2003

(54) PROCESS FOR PURIFICATION AND DRYING OF POLYMER HYDROGELS

(75) Inventors: Peter D. McDonnell, Bury St. Edmunds (GB); Gary S. Rea, Northboro, MA (US); Peter W. Thomas, Haverhill (GB); Mark F. Larrousse, Nashua, NH (US); Richard V. Bodmer, Jr., Belmont, MA (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 10/066,411

(22) Filed: Jan. 31, 2002

(65) Prior Publication Data

US 2003/0078366 A1 Apr. 24, 2003

Related U.S. Application Data

(63) Continuation-in-part of application No. 09/973,470, filed on Oct. 9, 2001.

(51) Int. Cl.[7] .................................................. C08F 6/00
(52) U.S. Cl. .................. 528/480; 502/104; 502/105; 502/208; 502/235; 502/236; 502/238; 502/239; 502/242; 502/251; 502/256; 502/414; 502/439; 502/514; 526/96; 526/98; 526/104; 526/105; 526/106
(58) Field of Search .......................... 528/480; 526/96, 526/98, 105, 106, 104; 502/104, 105, 208, 236, 414, 439, 514, 235, 238, 239, 242, 251, 256

(56) References Cited

U.S. PATENT DOCUMENTS

| | | | |
|---|---|---|---|
| 4,181,718 A | 1/1980 | Mason et al. | 424/180 |
| 4,540,760 A | 9/1985 | Harada et al. | 526/211 |
| 4,605,701 A | 8/1986 | Harada et al. | 525/107 |
| 4,794,166 A | 12/1988 | Engelhardt et al. | |
| 4,920,202 A | 4/1990 | Irie et al. | 528/500 |
| 5,200,482 A | 4/1993 | Gartner | 526/295 |
| 5,496,545 A | 3/1996 | Holmes-Farley et al. | 424/78.11 |
| 5,607,669 A | 3/1997 | Mandeville, III et al. | 424/78.12 |
| 5,667,775 A | 9/1997 | Holmes-Farley et al. | 424/78.11 |
| 5,679,717 A | 10/1997 | Mandeville, III et al. | 514/742 |
| 6,153,553 A * | 11/2000 | Auburn et al. | 502/208 |
| 6,180,754 B1 | 1/2001 | Stutts et al. | 528/422 |
| 6,313,061 B1 * | 11/2001 | Denton et al. | 502/236 |

FOREIGN PATENT DOCUMENTS

| | | |
|---|---|---|
| EP | 0 555 980 A1 | 8/1993 |
| EP | 0 997 148 A1 | 5/2000 |
| EP | 1 153 940 A1 | 11/2001 |
| JP | 63286405 | 11/1988 |
| WO | WO 95/05161 | 2/1995 |
| WO | WO 00/63259 | 10/2000 |
| WO | WO 01/18072 A1 | 3/2001 |
| WO | WO 01/18073 A1 | 3/2001 |

OTHER PUBLICATIONS

*Handbook of Industrial Drying*, Chapter 34, 2nd Ed. A.S. Mujumdar (Ed.) Marcel Dekker Inc., New York (1995).

* cited by examiner

*Primary Examiner*—Terressa M. Boykin
(74) *Attorney, Agent, or Firm*—Hamilton, Brook, Smith & Reynolds, P.C.

(57) ABSTRACT

This invention relates to a method for purifying and drying a polymer hydrogel. This invention is based in part upon the discovery that rapid drying of polymer hydrogels can eliminate the problem of unacceptable levels of soluble oligomers caused by prolonged thermal treatment. Rapid drying techniques allow drying hydrogels containing more water than was previously considered possible without a loss in product quality. Furthermore, it was discovered that slurries comprising polymer hydrogels and large quantities of water can be spray dried and that spray drying can be conducted with only minimal oligomer formation.

52 Claims, No Drawings

PROCESS FOR PURIFICATION AND DRYING OF POLYMER HYDROGELS

RELATED APPLICATION

This application is a continuation-in-part of U.S. application Ser. No. 09/973,470, filed Oct. 9, 2001, the entire teachings of the above application are incorporated herein by reference.

BACKGROUND OF THE INVENTION

Polymer hydrogels, or superabsorbent polymers, have become an extremely important class of materials over the last two decades (Buchholz, F. L. and N. A. Peppas (eds), Superabsorbent Polymers: Science and Technology, American Chemical Society, Washington, DC (1994)). Polymer hydrogels are characterized in part by their ability to absorb water and retain it under pressure. These materials are widely used in the manufacture of personal hygiene products. Polymer hydrogels also have important new pharmaceutical applications. With these new applications, though, extremely stringent purity requirements must be met. The hydrophilic nature of these materials complicates their purification and drying and consequently increases manufacturing expenses.

Typically, polymer hydrogels are isolated from manufacture as wet gels containing impurities from manufacture such as monomers, initiator residues, salts, solvents, and soluble oligomers. Depending upon their intended application, the polymers are purified and dried to the extent required. Drying is usually necessary because it helps to minimize transportation and packaging costs and it conditions the polymers to absorb large quantities of liquid. Drying may also stabilize the product against microbial or chemical degradation.

Pharmaceutical applications, particularly, demand the control of soluble oligomer content. With many pharmaceuticals, the polymer is preferably insoluble. Soluble components can be considered "contaminants" or undesired components. ICH Guidelines have been established to control the levels of such contaminants in bulk active pharmaceuticals (ICH, November 1999, CPMP/ICH/2737/99; Federal Register, 65, No. 130, July 2000, 45085. ICH, July 1977, CPMP/ICH/283/95; Federal Register, 62, No. 247, December 1997, 67377). Variation of the polymerization conditions is generally used to control levels of soluble polymer (Buchholz, F. L. and N. A. Peppas (eds), Superabsorbent Polymers: Science and Technology, American Chemical Society, Washington, DC (1994), p. 27). Soluble polymer can also be generated during post-reaction processing. Polymer hydrogels are shear sensitive and are subject to thermal degradation. Purification and drying processes can break high molecular weight polymer chains, increasing oligomer concentrations in the product.

Many polymeric hydrogels experience a cohesive phase at certain levels of moisture content. During this phase, polymer particles adhere to each other and equipment surfaces. This can make drying the hydrogel particularly challenging. In dryers that use mechanical agitation, hydrogels in a cohesive phase can cause strain upon and damage to impellers, turbines, and end seal assemblies. The motors and gearboxes of such driers need to be suitably robust which is reflected in the capital and operating costs.

Alternatively, attempts have been made to avoid a cohesive phase. Dry product can be back mixed to lower the moisture content of the dryer feed. However the size of equipment required is correspondingly increased. Further, it is unsuitable for materials which are cohesive at very low moisture content or for materials that are very wet at the beginning of the drying step. Other methods use additives to assist in drying, such as azeotrope-forming solvents or agents that affect the surface wetting of the product. However, the use of additives and organic solvents, such as methanol or isopropanol, can be detrimental to drug purity and generally increases production costs.

Drying of polymer hydrogels can be further complicated because some polymer hydrogels are sensitive to the atmosphere they are prepared in, especially when they are wet. For example, some wet polymer hydrogels may be subject to undesired oxidation upon thermal treatment. Controlling the drying atmosphere can add to the cost of manufacturing. Thus, processes which avoid the need to control drying atmosphere can be desired.

A further aspect of polymer hydrogel production often includes controlling the swell index of the product. The swell index measures the amount of a standard solution that is absorbed by the polymer under controlled conditions and is a common measure of the degree of cross-linking in a polymer (Buchholz, F. L., *Chemistry and Industry*, 56 (1999)). Other factors also can be important in determining the swell index (e.g., concentration of monomer, Mathur, A. M. et al., *Journal of Controlled Release* 54:177 (1998); or presence of gas or vapor during gelation, Chen, J. et al., *J Biomed. Mater. Res.* 44:53 (1999)). The swell index also can be influenced by the morphology of the product. Morphology can be affected by thermal treatment (For example, Sperling, L. H., *Introduction to Physical Polymer Science* (John Wiley & Sons, Inc., New York, (1992))) such as that involved in many types of drying.

A need exists to simplify existing manufacturing techniques to reduce production costs. Manufacturers need a process that does not use organic solvents or unnecessary additives, has high product throughput, maintains high purity standards, and maintains desired physical and chemical polymer characteristics.

SUMMARY OF THE INVENTION

This invention relates to a method for purifying and drying a polymer hydrogel. This invention is based in part upon the discovery that rapid drying of polymer hydrogels can eliminate the problem of unacceptable levels of soluble oligomers caused by prolonged thermal treatment. Rapid drying techniques allow drying hydrogels containing more water than was previously considered possible without a loss in product quality. Furthermore, it was discovered that slurries comprising polymer hydrogels and large quantities of water can be spray dried and that spray drying can be conducted with only minimal oligomer formation.

Spray drying polymer hydrogels has many advantages over previously known drying techniques. Spray drying provides adequate separation of hydrogel particles as they pass through the cohesive state, thus solving the problems of agglomeration that are associated with that drying regime. By reducing agglomeration, spray drying reduces the need for size reduction processing of the dried polymer hydrogel.

Furthermore, spray drying allows the use of previously unavailable purification options without resorting to organic solvents that are expensive and that present processing and waste disposal challenges. Because slurries containing large quantities of water can be spray dried using the present invention, repeated water washing of the hydrogel can be used to remove undesired contaminants. Spray drying solves the problems arising from prolonged thermal treatment.

Prolonged drying times are not needed to remove excess water, and it is not necessary reduce drying time by using volatile organic solvents.

Spray drying avoids damaging shear-fragile polymer hydrogels passing through the cohesive phase. Conventional thermal dryers often damage fragile hydrogels during the cohesive phase, resulting in soluble oligomer formation. Spray drying also permits improved particle size control.

Further, the method of the present invention permits continuous processing units, achieving high throughput and having low operating and capital costs.

DETAILED DESCRIPTION OF THE INVENTION

This invention relates to a method for purifying and drying a polymer hydrogel. The method comprises (a) washing the polymer hydrogel with a water wash medium until the measured conductivity of the resulting slurry comprising the hydrogel and wash water medium is about less than about 5 mS/cm and/or the resulting slurry is in the substantial absence of monomer, oligomer, and other contaminants and (b) spray drying the resulting slurry. The method of the present invention allows repeated water washing and/or water washing with significant concentrations of water because the use of spray drying allows the moisture content of the resultant slurry to be higher than previously thought possible without undesired oligomer formation. Preferably, the water wash medium is free of other solvents. Using water such as potable or purified water as a washing medium avoids the use of organic solvents which are more expensive, add processing and disposal costs, and are environmentally undesirable. In addition to increased purification options, spray drying polymer hydrogels has the advantage of often eliminating the need for particle size reduction after drying.

The term "slurry" as used herein refers to a mixture comprising polymer hydrogel and water. The hydrogel can be added to the washing step as a filter cake (e.g., a wet filter cake) or as a slurry (e.g., a pumpable slurry). The hydrogel can be transferred to the washing step via gravity, pump, pressure, vacuum, or other mechanical action (e.g., with a screw or belt). Where the hydrogel is transferred as a pumpable slurry, the slurry preferably has a dry solids content of about 2 to about 20% by weight. It is generally preferred to employ transfer mechanisms that minimize particle attrition due to shear. Upon entry into the spray drying step, the slurry must be sufficiently dilute and non-viscous to be atomized, without clogging the nozzle(s). These parameters will be discussed in more detail below.

The term "polymer hydrogel" as used herein refers to a polymeric material that is capable of retaining water near or within the structure of the material. The polymer material may be either a homopolymer or a copolymer. The polymers of the invention may or may not be cross-linked with a cross-linking agent.

A defining characteristic of a polymer hydrogel is the ability of the material to retain water, even under considerable pressure. Generally, the hydrogel is water swellable but is not substantially water soluble. The molecular weight of the final polymerized state; the chemical characteristics of the constituent monomer groups, including the degree of ionization of the salt form; and the chemical characteristics of substituted groups on the polymer chain may all influence the ability of the polymer to retain water. Constituent monomer groups or substituted groups on the polymer chain influence the water holding capacity of the polymer. The hydrophillic character of these structures can determine, at least in part, the water retaining capacity of the polymer hydrogel. The invention has particular utility with polymer hydrogels that experience a cohesive phase.

The term "cohesive phase" as used herein refers to a state or condition wherein the polymer hydrogel is self-adhering.

The polymer hydrogels for use in the claimed invention can be organic polymers. The polymers can include, for example, industrial polymers (e.g., for use in ion exchange), absorbent polymers (e.g., for use in disposable diapers), agrochemicals, or, preferably, pharmaceutical polymers.

In one aspect of the present invention, the polymer hydrogel is characterized by a repeating unit having the formula

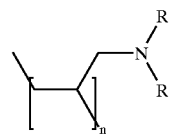

or a copolymer thereof, wherein n is an integer and each R, independently, is H or a lower alkyl (e.g., having between 1 and 5 carbon atoms, inclusive), alkylamino (e.g., having between 1 and 5 carbons atoms, inclusive, such as ethylamino) or aryl (e.g., phenyl) group.

In a second aspect, the polymer hydrogel is characterized by a repeating unit having the formula

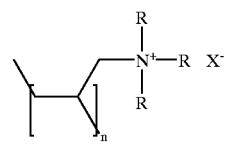

or a copolymer thereof, wherein n is an integer, each R, independently, is H or a lower alkyl (e.g., having between 1 and 5 carbon atoms, inclusive), alkylamino (e.g., having between 1 and 5 carbons atoms, inclusive, such as ethylamino) or aryl (e.g., phenyl) group, and each $X^-$ is an exchangeable negatively charged counterion.

One example of a copolymer hydrogel according to the second aspect of the invention is characterized by a first repeating unit having the formula

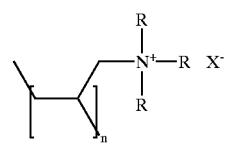

wherein n is an integer, each R, independently, is H or a lower alkyl (e.g., having between 1 and 5 carbon atoms, inclusive), alkylamino (e.g., having between 1 and 5 carbons atoms, inclusive, such as ethylamino) or aryl group (e.g., phenyl), and each $X^-$ is an exchangeable negatively charged counterion; and further characterized by a second repeating unit having the formula

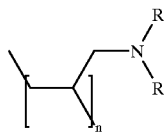

wherein each n, independently, is an integer and each R, independently, is H or a lower alkyl (e.g., having between 1 and 5 carbon atoms, inclusive), alkylamino (e.g., having between 1 and 5 carbons atoms, inclusive, such as ethylamino) or aryl group (e.g., phenyl).

In a fourth aspect, the polymer hydrogel is characterized by a repeating unit having the formula

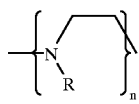

or a copolymer thereof, wherein n is an integer, and R is H or a lower alkyl (e.g., having between 1 and 5 carbon atoms, inclusive), alkylamino (e.g., having between 1 and 5 carbons atoms, inclusive, such as ethylamino) or aryl group (e.g., phenyl).

One example of a copolymer hydrogel according to the second aspect of the invention is characterized by a first repeating unit having the formula

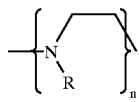

wherein n is an integer, and R is H or a lower alkyl (e.g., having between 1 and 5 carbon atoms, inclusive), alkylamino (e.g., having between 1 and 5 carbons atoms, inclusive, such as ethylamino) or aryl group (e.g., phenyl); and further characterized by a second repeating unit having the formula

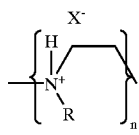

wherein each n, independently, is an integer and R is H or a lower alkyl (e.g., having between 1 and 5 carbon atoms, inclusive), alkylamino (e.g., having between 1 and 5 carbons atoms, inclusive, such as ethylamino) or aryl group (e.g., phenyl).

In a fifth aspect, the polymer hydrogel is characterized by a repeating group having the formula

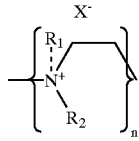

or a copolymer thereof, wherein n is an integer, and each $R_1$ and $R_2$, independently, is H or a lower alkyl (e.g., having between 1 and 5 carbon atoms, inclusive), and alkylamino (e.g., having between 1 and 5 carbons atoms, inclusive, such as ethylamino) or aryl group (e.g., phenyl), and each $X^-$ is an exchangeable negatively charged counterion.

In one preferred polymer hydrogel according to the fifth aspect of the invention, at least one of the R groups is a hydrogen group.

In a sixth aspect, the polymer hydrogel is characterized by a repeat unit having the formula

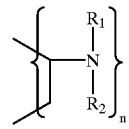

or a copolymer thereof, where n is an integer, each $R_1$ and $R_2$, independently, is H, an alkyl group containing 1 to 20 carbon atoms, an alkylamino group (e.g., having between 1 and 5 carbons atoms, inclusive, such as ethylamino), or an aryl group containing 1 to 12 atoms (e.g., phenyl).

In a seventh aspect, the polymer hydrogel is characterized by a repeat unit having the formula

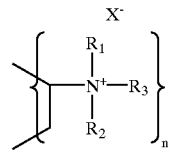

or a copolymer.thereof, wherein n is an integer, each $R_1$, $R_2$ and $R_3$, independently, is H, an alkyl group containing 1 to 20 carbon atoms, an alkylamino group (e.g., having between 1 and 5 carbons atoms, inclusive, such as ethylamino), or an aryl group containing 1 to 12 atoms (e.g., phenyl), and each $X^-$ is an exchangeable negatively charged counterion.

The negatively charged counterions may be organic ions, inorganic ions, or combination thereof. The inorganic ions suitable for use in this invention include the halides (especially chloride), phosphate, phosphite, carbonate, bicarbonate, sulfate, bisulfate, hydroxide, nitrate, persulfate, sulfite, and sulfide. Suitable organic ions include acetate, ascorbate, benzoate, citrate, dihydrogen citrate, hydrogen citrate, oxalate, succinate, tartrate, taurocholate, glycocholate, and cholate. The polymer salt is preferably the hydrogen chloride salt and can include low salt or reduced salt forms of the polymer where, for example, the salt is present in an amount between about 4% and 30% based upon weight of polymer. Another example is sevelamer, which is stored and administered as a salt in which about 40% of the amine groups are protonated as the hydrochloride salt (about 18% by weight of the polymer is chloride). Another example is poly(allylamine) wherein about 9.0% to about 27.0% of the amine groups in the poly(allylamine) are protonated, such as poly(allylamine hydrochloride) where between about 4.0% and about 12.0% of the polymer, by weight, is chloride anion.

Preferred polymer hydrogels have the structures set forth as described above. The polymers are preferably cross-linked, in some cases by adding a cross-linking agent to the reaction mixture during polymerization. Examples of suitable cross-linking agents are diacrylates and dimethacrylates (e.g., ethylene glycol diacrylate, propylene glycol diacrylate, butylene glycol diacrylate, ethylene glycol dimethacrylate, propylene glycol dimethacrylate, butylene glycol dimethacrylate, polyethyleneglycol dimethacrylate, polyethyleneglycol diacrylate), methylene bisacrylamide, methylene bismethacrylamide, ethylene bisacrylamide, epichlorohydrin, toluene diisocyanate, ethylenebismethacrylamide, ethylidene bisacrylamide, divinyl benzene, bisphenol A dimethacrylate, bisphenol A diacrylate, 1,4 butanedioldiglycidyl ether, 1,2 ethanedioldiglycidyl ether, 1,3-dichloropropane, 1,2-dichloroethane, 1,3-dibromopropane, 1,2-dibromoethane, succinyl dichloride, dimethylsuccinate, acryloyl chloride, or pyromellitic dianhydride. The amount of cross-linking agent is typically between about 0.5 and about 75 weight %, and preferably between about 1 and about 25% by weight, based upon combined weight of cross-linking agent and monomer. In another embodiment, the cross-linking agent is present between about 2 and about 20% by weight.

In some cases the polymers are cross-linked after polymerization. One method of obtaining such cross-linking involves reaction of the polymer with difunctional crosslinkers, such as epichlorohydrin, succinyl dichloride, the diglycidyl ether of bisphenol A, pyromellitic dianhydride, toluene diisocyanate, and ethylenediamine.

In particular, the invention is useful for cross-linked poly(allylamine hydrochloride). More preferred is epichlorohydrin cross-linked poly(allylamine hydrochloride). This polymer hydrogel is characterized by a repeat unit having the formula

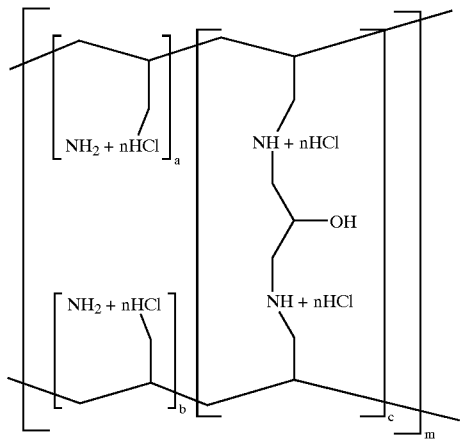

wherein a and b are the number of primary amine groups and a+b is about 9, c is the number of cross-linking groups and c is about 1, n is the fraction of protonated amines and n is about 0.4, and m is an integer. The polymer is called sevelamer and is sold under the trademark, Renagel®. Another preferred polymer is colesevelam, sold under the trademark Welchol™. The polymer is epichlorohydrin cross-linked poly(allylamine) alkylated with decylbromide and trimethylammonium hexylbromide.

The term "contaminants" as used herein refers to undesired particles, compounds, elements, ions, molecules, substances, or combination thereof present with the hydrogel. Contaminants can include substances present with the hydrogel as a result of a chemical reaction in which the polymer hydrogel is produced. Contaminants can include unreacted chemical reactants, partially reacted chemical reactants, chemical reaction byproducts, substances present during chemical reaction but not participating in such, and substances added to the products of chemical reactions either inadvertently or purposefully. Examples of contaminants include monomers, oligomers, salts, and solvents. In general, the contaminants are water-soluble and/or can be removed by the wash water medium.

The term "wash water medium" as used herein refers to water used to remove contaminants from the hydrogel. The wash water medium as added to the hydrogel can be recycled water, fresh water, potable water, or preferably, deionized water. The wash water medium is preferably added to the hydrogel in an amount sufficient to remove substantial amounts of contaminants, preferably at least about 95% of unreacted monomer(s), cross-linking agent(s), oligomer(s), and/or other soluble components. For example, the wash water medium can be added to the hydrogel in an amount resulting in a mixture comprising at least about 80% by weight water, preferably at least about 90% by weight water, more preferably, at least about 95% by weight water, or even more preferably, at least about 98% by weight water.

The term "conductivity" as used herein refers to a measure of the ease by which electrical current may pass through the slurry comprising the polymer hydrogel and the wash water medium and is an indicator of the concentration of contaminants in the slurry. The allowable contaminant concentration is usually selected by the intended application of the polymer hydrogel. In the case of production of pharmaceutical grade polymer hydrogel products, the conductivity limit used is generally quite low. Repeated washing may be necessary to achieve the required product purity. One advantage of the present invention is that repeated water washing is allowable because the use of rapid drying techniques allows the moisture content of the purified slurry to be higher than previously thought possible.

Preferably, the conductivity of the slurry prior to spray drying is less than about 5 mS/cm. More preferably, the conductivity is less than about 0.5 mS/cm. Even more preferably, the conductivity is less than about 0.05 mS/cm.

In one embodiment of the present invention, the method comprises (a) washing the polymer hydrogel with a water wash medium until the measured conductivity of the slurry comprising the hydrogel and wash water medium is about less than about 5 mS/cm and/or the slurry is in the substantial absence of monomer, oligomer, and other contaminants and (b) spray drying the resulting slurry as part of a continuous process. Continuous processes hold many advantages over batch or semi-batch processes. Continuous processes generally have, among other advantages, higher throughput capabilities, lower capital equipment costs, and lower labor costs. An advantage of the present invention is that the method comprising purifying and drying the polymer hydrogel is well suited to continuous processing. Alternatively, the washing step may be preformed in a batch or semi-continuous process as well. The washing step can be conducted cocurrently or counter-currently, preferably counter-currently.

The wash water medium can be a liquid or a vapor. Preferably, the wash water medium used in the present method is liquid with a temperature between about 0° and 100° C. More preferably, the temperature of the wash water medium is between about 5° and 90° C., and more preferably, is between about 10° and 80° C., such as room temperature. The temperature of the wash water medium is selected in part by the physical and chemical nature of the contaminants and also in part by the physical and chemical nature of the polymer hydrogel. Thus, the temperature is selected to optimize contaminant solubility without degrading or altering the hydrogel.

In another embodiment of the invention, the method comprises (a) washing the polymer hydrogel, (b) decanting, at some point in time before the slurry comprising polymer hydrogel and water is spray dried, the polymer hydrogel from the wash water medium or the wash water medium from the hydrogel, and (c) spray drying the resulting slurry. Preferably, the polymer hydrogel is decanted from the wash water medium at least once before the slurry is spray dried. The polymer hydrogel may be separated from the wash water medium using any number of pieces of commercial processing equipment. Equipment acceptable for decanting the wash water medium from the polymer hydrogel include gravity sedimentation continuous countercurrent decantation devices, continuous filters, batch filters, batch decanting systems, and centrifuges, among others. Decanting the wash water medium from the hydrogel can be performed using equipment that operates continuously, semi-continuously, or as a batch process. Equipment that operates continuously is preferred. Equipment that operates continuously provides several efficiencies including high throughput and low operating and capital costs. In one embodiment, a centrifuge is used to separate the wash water medium from the hydrogel. Acceptable centrifuges can include sedimentation centrifuges and centrifugal filters, including solid bowl centrifuges. In a preferred embodiment, a belt filter is used to decant/separate the wash water medium from the hydrogel. Preferably, a Pannevis RT belt filter is used to separate the wash water medium from the hydrogel. Preferably, a 3-stage countercurrent wash is applied to the polymer hydrogel using the belt filter where the belt speed is about 1.7 cm/s, the feed rate is about 98 kg/h, the cake depth is about 25–35 mm, and the wash medium rate is about 62 L/h.

The slurry can be directly transported to the spray dryer or can be further diluted, as appropriate. In another embodiment of the invention, the method comprises (a) washing the polymer hydrogel, (b) dispersing the polymer hydrogel in water prior to spray drying, and (c) spray drying the resulting slurry. By further dispersing the polymer hydrogel in water prior to spray drying, the resulting mixture can be easily transferred to the spray dryer. Dispersing the polymer hydrogel in water lowers the feed strength of the purified slurry to a desired level. The feed strength of the polymer hydrogel slurry is preferably between about 2 to about 12% by weight solids where the polymer hydrogel is colesevelam and about 2 to about 4% by weight solids where the polymer hydrogel is sevelamer. Alternatively, it may be desirable to control viscosity of the slurry. For example, this can be achieved by varying the water content of the slurry in response to measurement of back pressure to the spray dryer feed nozzle(s). For instance, the back pressure for nozzles of 0.7 to 0.9 mm in diameter is in the range of 10 to 60 bar(gauge) when feeding a slurry of approximately 3% by weight solids at about 60 liters/hour. The polymer hydrogel can be dispersed in water prior to drying using any of a number of techniques including mixing and grinding. Alternatively, the hydrogel can be ground to the approximate particulate size prior to washing. Preferably, a mill device can used to disperse the polymer hydrogel in water. The mill device can be selected from among a number of devices including dispersers, colloid mills, homogenizers, grinders, fluid energy devices, jet mills, and mixers. Preferably, the mill device can be selected from among a disperser, a colloid mill, or a homogenizer. More preferably, a continuously operating mill device can be selected from among a disperser, a colloid mill, or a homogenizer. Even more preferably, the mill device is an inline disperser. Inline dispersers provide adequate dispersion of the polymer hydrogel for subsequent spray drying and also permit continuous operation. Preferably, the polymer hydrogel is dispersed in water prior to drying such that the wet hydrogel has a particle size of between about 150 and about 500 μm. Preferably, a Ystral 3 Stage Disperser, using 2 mm stator slots and operating in once through mode adjusted to achieve desired particle size, is used to disperse the polymer hydrogel in water.

In another embodiment of the invention, the method further comprises the spray drying of the slurry by distributing the slurry through a nozzle or through a rotary disperser to a drying vessel. The preferred device for distributing the slurry to the drying vessel is a nozzle. The nozzle can be a pressure nozzle or a two fluid nozzle. Preferably, a pressure nozzle is used.

In another embodiment of the invention, the water content of the slurry is adjusted prior to spray drying. The water content is adjusted so that the viscosity of the resulting slurry is low enough to permit the mixture to be spray dried and also so that the polymer hydrogel is adequately dispersed in the water. The preferred ratio of weight of polymer to weight of water is less than about 0.2, preferably less than about 0.1, and more preferably less than about 0.05.

Preferably, the feed pressure of the slurry as distributed to the drying vessel is greater than about 15 bar (gauge). More preferably, the feed pressure of the slurry distributed to the drying vessel is between about 18 and 40 bar (gauge). Feed temperatures are product specific and depend in part upon the properties of the polymer hydrogel and also upon the extent of drying required. A feed temperature should be chosen that is below the glass transition temperature of the hydrogel and that will not thermally degrade the material. Preferably, the feed temperature of the slurry as distributed to the drying vessel is between about 10° C. and 100° C. More preferably, the feed temperature of the slurry distributed to the drying vessel is between about 15° C. and 80° C., such as room temperature. Preferably, the gas input temperature to the drying vessel is between 100° C. and 400° C. More preferably, the gas input temperature to the drying vessel is between 150° C. and 350° C. Preferably, the size of the nozzle used to distribute the slurry to the drying vessel is greater than 0.7 mm in diameter. More preferably, the size of the nozzle used to distribute the slurry to the drying vessel is 0.9 mm in diameter. Preferably, a Schlick Kreisl-Nebelduese Model 121 spray nozzle is used.

The drying vessel can be of any size or shape, depending in part on the specific polymer hydrogel to be dried and also in part on the water content of the purified slurry that is to be fed to the vessel. The preferred drying vessel is a cylindrical chamber about 1 to 2 m in diameter and about 5 to 10 m in height. The preferred drying vessel is a cylindrical chamber about 2 m in diameter and about 8 m in height. Preferred vessels include the Niro Tall Form Dryer TFD 20.

In another embodiment of the present invention, the method comprises spray drying the polymer hydrogel into a drying medium such as an air atmosphere. The air of the drying vessel atmosphere may be exchanged in a closed or open loop system. Preferably, an open loop air exchange system is used. The air atmosphere may be moisture conditioned by adjusting the amount of water vapor entrained within it prior to entry of the air into the drying vessel. Preferably, the air used is not moisture conditioned prior to entry of the air into the drying vessel.

The term "drying medium" as used herein refers to the atmosphere of a drying vessel. The composition of the atmosphere may include air, with or without moisture content, an inert gas, such as nitrogen, or any combination thereof. The temperature of the drying medium can depend upon the type of materials processed and their desired final moisture content.

In another embodiment of the present invention, the method further comprises the additional step of adjusting the final water content of the spray dried polymer hydrogel, for example, with a plate dryer. Often process conditions in the drying step cannot be precisely and/or consistently controlled. As a result, polymer hydrogel exiting the drying step of the method contains either more or less moisture than that desired in the final polymer hydrogel product. It has further been discovered that the use of plate dryers with controlled humidity allows the controlled rehydration of polymer hydrogels without their passing through a cohesive phase. This gives greater product homogeneity and allows the elimination of downstream particle size reduction measures, because the degree of agglomeration is greatly reduced. Also additional thermal treatment of the polymer hydrogel exiting the drying step may be desired. The plate dryer can provide the requisite additional thermal treatment. Because the thermal history of polymers can be reflected in their physical properties, a method of providing a narrow residence time distribution at controlled temperature is preferred. Plate dryers may also avoid compaction of product. Use of plate dryers can further permit the elimination of downstream particle size reduction measures needed due to agglomeration such as that which occurs during other types of thermal treatment. The plate dryer can be operated in a continuous, semi-continuous, or batch mode. Preferably, the plate dryer is operated in continuous mode. The plate dryer may be used for thermal treatment with or without humidity control. Preferably, humidity control within the plate dryer is used to hydrate or dehydrate the polymer hydrogels to the desired moisture content. More preferably, the drying medium within the plate dryer has at least some moisture content. Even more preferably, the drying medium within the dryer is air. Even more preferably, the drying medium within the dryer is air with a relative humidity of greater than about 10%. Temperatures can be selected to avoid the cohesive phase. Generally, the temperature is greater than 0° C. More preferably, the temperature is greater than about room temperature. Even more preferably, the temperature is less than about 100° C. The residence time of the material in the dryer is dependant upon the type of material processed, the temperature of the drying medium, and the desired final moisture content. Preferably, the residence time is less than 24 hours. Even more preferably, the residence time is between about 5 and 24 hours. Preferably, a KraussMaffei plate dryer is used due to better heat transfer and lower airflow.

In one embodiment of the present invention, the polymer hydrogel is an organic polymer hydrogel used as an active pharmaceutical ingredient. The method of the present invention is particularly suited for use in preparing organic polymer hydrogels used as active pharmaceutical ingredients. The present invention and the discoveries that precipitated it allow the preparation of these materials using relatively low cost processes that yield organic polymer hydrogels that meet the exceedingly stringent purity requirements for mammalian ingestion.

In one embodiment of the present invention, polymer hydrogels that are sensitive to the atmosphere in which they are dried are spray dried in an inert gas atmosphere. In another embodiment of the present invention, a water-washed slurry comprising cross-linked poly(allylamine) is spray dried in an inert gas atmosphere. It is known that wet cross-linked poly(allylamine) can react with carbon dioxide present during thermal treatment, such as drying. Thus it may be desirable to dry in an atmosphere substantially free from carbon dioxide, for example in a nitrogen gas.

The unexpected discovery that rapid drying of cross-linked poly(allylamine) minimizes reaction with carbon dioxide, however, permits drying in an air atmosphere. Specifically, the spray drying step of the present invention can be accomplished sufficiently rapidly and under conditions such that the drying step can be conducted in air without substantial polymer reaction with carbon dioxide. Thus, in a preferred embodiment, the cross-linked poly (allylamine) slurry is spray-dried in an air atmosphere.

Without being bound by any particular theory, rapid drying results in rapid transport of water away from the cross-linked poly(allylamine). Rapid transport of water away from the cross-linked poly(allylamine) is thought to prevent carbon dioxide from reaching the surface of the polymer and subsequently reacting. Therefore spray drying of air-sensitive polymer hydrogels, such as sevelamer, may be accomplished without employing a controlled drying atmosphere or closed cycle conditions which require greater capital and operating costs.

EXAMPLE 1

A suspension of epichlorohydrin cross-linked poly (allylamine hydrochloride) (U.S. Pat. Nos: 5,969,090 and 5,900,475) was prepared in the following manner. Poly (allylamine hydrochloride) (50% w/w, 426 kg) was charged to a 1000 liter reactor and water (200 liters) was added. Sodium hydroxide solution (32% w/w, 208 kg) was added, followed by 85 liters of water. The mixture was stirred for 1 hour and filtered to a 2500 liter reactor. The transfer line was rinsed with water (217 kg) and acetonitrile (1300 liters) added. The temperature was adjusted to 40° C. and epichlorohydrin (20 kg) added. The mixture was stirred at 40 to 50° C. for 1.5 hours and then heated to reflux for 16 hours. The resulting product slurry may be isolated and washed in several ways.

EXAMPLE 1a

Crude Isolation Using Decanter Centrifuge

The crude gel suspension was fed to an Alfa Laval CHNX 318 decanter centrifuge at 9.5 to 12.3 liters/minute with bowl speeds of 2500 rpm to 3250 rpm and differential speeds between 1.3 and 10 rpm. The discharged gel had a moisture content of 75 to 82%.

EXAMPLE 1b

Crude Isolation Using Basket Centrifuge

The crude gel suspension was fed to a Broadbent T46 48" diameter basket centrifuge to give a 5" cake depth. Each load was ploughed off and had a residual moisture level of 72 to 78%.

EXAMPLE 1c

Crude Isolation Using Belt Filter

The crude suspension was fed to a Pannevis 0.2 $m^2$ RT/GT belt filter to give a 3 cm cake depth to give gel with a moisture content of 79%.

The gel from any of the above processes is suspended in USP Purified Water to give a conductivity of 13 to 27 mS/cm. The gel is then isolated in one of several ways.

EXAMPLE 2a

Washed Gel Isolation and Washing Using Decanter Centrifuge

A gel suspension of 27 mS/cm conductivity was fed to a Westfalia CA 220 decanter centrifuge at 250 to 800 liters/ hour with a bowl speed of 4500 to 5100 rpm and differential speed of 5 to 25 rpm. A water wash was applied concurrently (2 to 8 liters/minute). The resulting gel had a moisture level of between 86 and 94%. Further washes as a slurry and on the centrifuge brought the conductivity of the filtrates to 51 µS/cm.

EXAMPLE 2b

Washed Gel Isolation and Washing Using Basket Centrifuge

A gel suspension of 17 mS/cm conductivity was fed to a Broadbent T46 48" diameter basket centrifuge to a cake depth of 5" and washed with water on the basket (200 liters/hour). Each load was ploughed off and further washed as a slurry and on the centrifuge to give a final slurry conductivity of <1 mS/cm and a residual moisture level of 91 to 95%.

EXAMPLE 2c

Washed Gel Isolation and Washing Using Inverting Centrifuge With Pressurized Basket A gel suspension of 17 mS/cm conductivity was fed to a Heinkel HF 300 inverting centrifuge at 5 liters/minute, nitrogen pressure was applied to the basket, then a water wash, nitrogen again and discharge. The residual moisture content of the cake was 92 to 94%.

EXAMPLE 2d

Washed Gel Isolation and Washing Using a Belt Filter

A gel suspension of 17 mS/cm conductivity was fed to a Pannevis 0.2 $m^2$ RT/GT belt filter to give a cake depth of 11 mm. Water washes were applied using 2 counter current stages to give gel with a moisture content of 92 to 95%.

The resulting product may be dried in a variety of ways.

EXAMPLE 3a

Drying of Gel by Spray Drying

The resulting gel was added to water to render it pumpable and passed through an Ystral in line disperser Z18500 S/W3DGA-184/3 P with 2 mm stator slots at 850 liters/hour. The slurry was spray dried through a 0.9 mm fluid nozzle at around 20 barg with an inlet temperature of 260° C. and an outlet temperature of 105° C., collecting the product in a cyclone. The resulting product had a residual moisture level of 3 to 7%.

EXAMPLE 3b

Drying of Gel by Volume Reduction With Solvent, Followed by Vacuum Drying Using High Shear Mixer The damp gel was suspended in 2-propanol (IPA) and adjusted to 70% (IPA/water) v/v, and isolated on a Krauss-Maffei 48" vertical axis basket centrifuge. This gave gel with a moisture level of 58%. The product (27.2 kg) was loaded into a Morton FM-130 vacuum drier and the agitator started at 80 rpm. The heating jacket temperature was set at 80° C. and the vacuum adjusted to 55 to 60 Torr by bleeding air into the vacuum pump. Drying was continued until the onset of the cohesive phase, at which time the product temperature and vacuum level in the drier steadily rose and fluctuations in the agitator increased. Once the power draw fluctuations exceeded 14 amps on the main drive shaft agitation was stopped and the air bleed into the vacuum pump stopped. The moisture level in the product was 9.5%. The product was allowed to stand in the drier for approximately 30 minutes under full vacuum and the drier restarted. No power draw fluctuations were observed. The moisture level at this stage was 6.4%. Drying was continued for a further 25 minutes and the product discharged.

EXAMPLE 3c

Drying of Gel by Fluidized Bed

Water wet gel (9.88 kg, residual moisture 97.2%) was charged to a Glatt GPCG-5 fluid bed drier with 22 liter bowl. The dryer was run with an inlet temperature of 29° C., increasing to 78° C. over 2 hours 24 minutes. Air flow was 150 cfm, increasing to 230 cfm after 88 minutes and to 300 cfm after approximately 2 hours. At this point the powder agglomerated and had to be broken up before further processing. Residual moisture in the product was 43% at this stage. After 70 minutes more drying with an inlet temperature of about 60° C. and an outlet temperature of 40° C. and air flow of between 220 and 160 cfm the product was discharged with a residual moisture level of 3%.

EXAMPLE 4a

Thermal Treatment in Laboratory Oven

Spray dried gel (5 g) was sealed in a 15 ml Falcon tube and stored at 65° C. for 68 hours. The starting swell index was 9.2. After 16 hours the swell index was 7.5 and after a total of 68 hours the swell index was 6.5. Incubation at 75° C. gave a product with very hard lumps that were difficult to break up.

EXAMPLE 4b

Thermal Treatment and Moisture Addition Using Agitated Pan Dryer

Spray dried gel (125 kg, moisture content 3.9%) was loaded to a Eurovent 1.2 m vacuum pan dryer. The jacket temperature was set to 60° C. and water (2.8 kg) added by spray. The product was slowly mixed at approximately 60° C., manually breaking up lumps from time to time. After 24 hours the swell index was 7.3 and the moisture content 5.5%. The product was cooled to below 45° C. and discharged to give 126.8 kg product.

EXAMPLE 4c

Thermal Treatment Using List DTB 6.3 Dryer

Spray dried gel (1.3 kg, 3.9% residual moisture) was loaded to a List DT(B) 6.3 dryer. The unit was sealed and the jacket temperature was set to 80° C. The agitator was started and the material processed for 5 hours. The swell index fell from 9.3 to 7.2 over this period.

EXAMPLE 4d

Thermal Treatment and Moisture Addition Using Wyssmont Turbo Drier

Spray dried gel was loaded via a screw fed to a K10 Wyssmont Turbo Dryer with 10 trays. The gas temperature in the chamber was maintained at approximately 65° C. and the humidity was controlled by bubbling air through hot water. The shelf speed was maintained at minimum, giving a residence time of about 8 hours per pass. After 13 hours at 60–65° C. and 20–25% relative humidity, the swell index had fallen from 8.6 to 7.4.

EXAMPLE 4e

Thermal Treatment and Moisture Addition Using Plate Dryer

A screw feeder was mounted on top of KraussMaffei TT 12/8 plate dryer with shelf temperature of 60° C. Humidity was controlled by bubbling air through a column of hot water. The feed rate was between 9.3 and 11.75 kg/h. After three passes through the unit the swell index had dropped from 8.8 to 7.7 and the residual moisture had gone from 4.6 to 8.1%.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for purifying and drying an organic polymer hydrogel, the method comprising:
   a) washing the polymer hydrogel with a water wash medium until the measured conductivity of the resulting slurry comprising the hydrogel and wash water medium is less than about 5 mS/cm; and
   b) spray drying the resulting slurry.

2. The method of claim 1 wherein the polymer is washed in a continuous process.

3. The method of claim 2 wherein the polymer is washed counter-currently.

4. The method of claim 2 wherein the temperature of the wash water medium is about 10 to 80° C.

5. The method of claim 1 wherein the polymer hydrogel is decanted from the wash water medium.

6. The method of claim 5 wherein the polymer hydrogel is decanted from the wash water medium using a belt filter.

7. The method of claim 1 further comprising the step of dispersing the polymer hydrogel in water prior to spray drying.

8. The method of claim 7 wherein a mill device is used to disperse the polymer hydrogel in water.

9. The method of claim 8 wherein the mill device is selected from the group consisting of a disperser, a colloid mill, and a homogenizer.

10. The method of claim 8 wherein the mill device is an inline disperser.

11. The method of claim 1 wherein the slurry is spray dried by distributing the slurry through a nozzle or a rotary dispenser to a drying vessel.

12. The method of claim 11 wherein the slurry has a weight of polymer hydrogel to weight of water ratio of less than about 0.20 before spray drying.

13. The method of claim 12 wherein the slurry is distributed to the drying vessel by a pressure nozzle.

14. The method of claim 12 wherein the slurry is distributed to the drying vessel at a feed pressure of about 18–40 bar (gauge) and at a feed temperature of about 150–350° C. by an approximately 0.9 mm pressure nozzle.

15. The method of claim 1 wherein the slurry is spray dried into an air atmosphere.

16. The method of claim 1 further comprising the step of adjusting the water content of the spray dried polymer hydrogel with a plate dryer.

17. The method of claim 16 wherein plate drying is accomplished under the following conditions: relative humidity is greater than about 10%, temperature of the drying medium is about 20–100° C., and residence time is about 12 to 24 hours.

18. The method of claim 1 wherein the polymer hydrogel is an organic polymer hydrogel used as an active pharmaceutical ingredient.

19. The method of claim 18 wherein the polymer hydrogel is a cross-linked poly(allylamine).

20. The method of claim 19 wherein the cross-linked poly(allylamine) is spray dried in an inert gas atmosphere.

21. The method of claim 20 wherein the cross-linked poly(allylamine) is spray dried in an atmosphere free of carbon dioxide.

22. The method of claim 21 wherein the cross-linked poly(allylamine) is spray dried in a nitrogen gas atmosphere.

23. The method of claim 19 wherein the cross-linked poly(allylamine) is spray dried in an air atmosphere.

24. The method of claim 18 wherein the polymer hydrogel is cross-linked poly(allylamine hydrochloride).

25. The method of claim 24 wherein the cross-linked poly(allylamine hydrochloride) is spray dried in an inert gas atmosphere.

26. The method of claim 24 wherein the cross-linked poly(allylamine hydrochloride) is spray dried in an air atmosphere.

27. A method for purifying and drying an amine polymer hydrogel, the method comprising:
   a) washing the polymer hydrogel with a water wash medium until the resulting slurry comprising the hydrogel and wash water medium is in the substantial absence of monomer, oligomer, and other contaminants; and
   b) spray drying the resulting slurry.

28. The method of claim 27 wherein the polymer is washed in a continuous process.

29. The method of claim 28 wherein the polymer is washed counter-currently.

30. The method of claim 28 wherein the temperature of the wash water medium is about 10 to 80° C.

31. The method of claim 27 wherein the polymer hydrogel is decanted from the wash water medium.

32. The method of claim 31 wherein the polymer hydrogel is decanted from the wash water medium using a belt filter.

33. The method of claim 27 further comprising the step of dispersing the polymer hydrogel in water prior to spray drying.

34. The method of claim 33 wherein a mill device is used to disperse the polymer hydrogel in water.

35. The method of claim 34 wherein the mill device is selected from the group consisting of a disperser, a colloid mill, and a homogenizer.

36. The method of claim 34 wherein the mill device is an inline disperser.

37. The method of claim 27 wherein the slurry is spray dried by distributing the slurry through a nozzle or a rotary dispenser to a drying vessel.

38. The method of claim 37 wherein the slurry has a weight of polymer hydrogel to weight of water ratio of less than about 0.20 before spray drying.

39. The method of claim 38 wherein the slurry is distributed to the drying vessel by a pressure nozzle.

40. The method of claim 38 wherein the slurry is distributed to the drying vessel at a feed pressure of about 18–40 bar (gauge) and at a feed temperature of about 150–350° C. by an approximately 0.9 mm pressure nozzle.

41. The method of claim 27 wherein the slurry is spray dried into an air atmosphere.

42. The method of claim 27 further comprising the step of adjusting the water content of the spray dried polymer hydrogel with a plate dryer.

43. The method of claim 42 wherein plate drying is accomplished under the following conditions: relative humidity is greater than about 10%, temperature of the drying medium is about 20–100° C., and residence time is about 12 to 24 hours.

44. The method of claim 27 wherein the polymer hydrogel is used as an active pharmaceutical ingredient.

45. The method of claim 44 wherein the polymer hydrogel is a cross-linked poly(allylamine).

46. The method of claim 45 wherein the cross-linked poly(allylamine) is spray dried in an inert gas atmosphere.

47. The method of claim 46 wherein the cross-linked poly(allylamine) is spray dried in an atmosphere free of carbon dioxide.

48. The method of claim 47 wherein the cross-linked poly(allylamine) is spray dried in a nitrogen gas atmosphere.

49. The method of claim 45 wherein the cross-linked poly(allylamine) is spray dried in an air atmosphere.

50. The method of claim 44 wherein the polymer hydrogel is cross-linked poly(allylamine hydrochloride).

51. The method of claim 50 wherein the cross-linked poly(allylamine hydrochloride) is spray dried in an inert gas atmosphere.

52. The method of claim 50 wherein the cross-linked poly(allylamine hydrochloride) is spray dried in an air atmosphere.

* * * * *